US012743046B2

(12) United States Patent
Sasami et al.

(10) Patent No.: US 12,743,046 B2
(45) Date of Patent: Sep. 22, 2026

(54) IMAGE FORMING SYSTEM WITH DETECTORS FOR DETECTING CHARACTERISTIC OF RECORDING MEDIUM, CONTROL METHOD, AND STORAGE MEDIUM

(71) Applicant: Konica Minolta, Inc., Tokyo (JP)

(72) Inventors: Shingo Sasami, Hino (JP); Masaru Ohtsuka, Tachikawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/812,436

(22) Filed: Aug. 22, 2024

(65) Prior Publication Data

US 2025/0076803 A1 Mar. 6, 2025

(30) Foreign Application Priority Data

Aug. 31, 2023 (JP) ................................ 2023-141008

(51) Int. Cl.
*G03G 15/00* (2006.01)

(52) U.S. Cl.
CPC ................................ *G03G 15/5029* (2013.01)

(58) Field of Classification Search
CPC ........... G03G 15/5029; G03G 15/5062; G03G 2215/0439
See application file for complete search history.

(56) References Cited

U.S. PATENT DOCUMENTS

2023/0176515 A1* 6/2023 Yoshikawa ............ G01N 27/04 399/45

FOREIGN PATENT DOCUMENTS

JP 2019-45740 A 3/2019

* cited by examiner

*Primary Examiner* — Hoang X Ngo
(74) *Attorney, Agent, or Firm* — RANKIN, HILL & CLARK LLP

(57) ABSTRACT

Disclosed is an image forming system including: an image former that forms an image on a recording medium; a first characteristic detector that is provided on an upstream side of the image former in a conveyance direction of the recording medium and detects characteristic information corresponding to a characteristic of the recording medium; and a second characteristic detector that is provided on a downstream side of the image former in the conveyance direction of the recording medium and detects the characteristic information. Based on a detection result of one characteristic detector that is one of the first characteristic detector and the second characteristic detector, the other characteristic detector of the first characteristic detector and the second characteristic detector is controlled.

18 Claims, 9 Drawing Sheets

IMAGE FORMING SYSTEM WITH DETECTORS FOR DETECTING CHARACTERISTIC OF RECORDING MEDIUM, CONTROL METHOD, AND STORAGE MEDIUM

BACKGROUND OF THE INVENTION

Technical Field

The present invention relates to an image forming system, a control method, and a storage medium.

Description of Related Art

When printing is performed on a sheet by an image forming apparatus such as a copier or a printer, the characteristics of the sheet, the environment inside the apparatus, and the like change before and after printing, particularly before and after large-volume printing.

In this regard, for example, the following image forming apparatus is described in Japanese Unexamined Patent Publication No. 2019-45740. Specifically, the image forming apparatus is capable of forming images on both sides of a sheet, and includes, on a conveyance path of the sheet, a plurality of detection sections that detect characteristics of the sheet. The image forming apparatus corrects an image to be printed on the back surface of the sheet based on the ratio of expansion or contraction of the sheet calculated from the temperature, the moisture content, and the like of the sheet before and after printing on the front surface of the sheet detected by the detection section.

In this way, by controlling the image forming conditions based on the results of detection by the plurality of detection sections provided on the conveyance path of the sheet, more appropriate image forming conditions can be set.

SUMMARY OF THE INVENTION

However, the detection section that detects the characteristics of the sheet gradually deteriorates according to the number of times of detection. For example, a case in which the detection section includes a light emitting element such as a light emitting diode (LED) as a light emitting section will be described. In this case, the light emitting element gradually deteriorates in accordance with the number of times of detection, and when the light emitting element deteriorates, the detection section cannot accurately detect the characteristic of the sheet.

The detection operation by the detection section is highly accurate and complicated processing as compared with sheet detection for normal sheet conveyance. For this reason, depending on the characteristics of the sheet to be detected, it is necessary to stop the sheet at the time of detection of the characteristics of the sheet by the detection section in order to ensure the detection accuracy, and there is a possibility that the productivity is lowered.

An object of the present invention is to provide an image forming system, a control method, and a storage medium that can prevent shortening of the life of a detection section that detects a characteristic of a sheet or a decrease in productivity.

To achieve at least one of the abovementioned objects, according to an aspect of the present invention, an image forming system reflecting one aspect of the present invention includes: an image former that forms an image on a recording medium; a first characteristic detector that is provided on an upstream side of the image former in a conveyance direction of the recording medium and detects characteristic information corresponding to a characteristic of the recording medium; and a second characteristic detector that is provided on a downstream side of the image former in the conveyance direction of the recording medium and detects the characteristic information, wherein based on a detection result of one characteristic detector that is one of the first characteristic detector and the second characteristic detector, the other characteristic detector of the first characteristic detector and the second characteristic detector is controlled.

To achieve at least one of the abovementioned objects, according to an aspect of the present invention, control method reflecting one aspect of the present invention is a control method of an image forming system including: an image former that forms an image on a recording medium; a first characteristic detector that is provided on an upstream side of the image former in a conveyance direction of the recording medium and detects characteristic information corresponding to a characteristic of the recording medium; and a second characteristic detector that is provided on a downstream side of the image former in the conveyance direction of the recording medium and detects the characteristic information, the control method including: controlling, based on a detection result of one characteristic detector that is one of the first characteristic detector and the second characteristic detector, the other characteristic detector of the first characteristic detector and the second characteristic detector.

To achieve at least one of the abovementioned objects, according to an aspect of the present invention, a storage medium reflecting one aspect of the present invention is: a non-transitory computer-readable storage medium storing a program for a computer of an image forming system including: an image former that forms an image on a recording medium; a first characteristic detector that is provided on an upstream side of the image former in a conveyance direction of the recording medium and detects characteristic information corresponding to a characteristic of the recording medium; and a second characteristic detector that is provided on a downstream side of the image former in the conveyance direction of the recording medium and detects the characteristic information, the program causing the computer to perform controlling, based on a detection result of one characteristic detector that is one of the first characteristic detector and the second characteristic detector, the other characteristic detector of the first characteristic detector and the second characteristic detector.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, one or more embodiments of the present invention will be described with reference to the drawings. However, the scope of the invention is not limited to the disclosed embodiments. In an embodiment of the present invention, an image forming apparatus included in an image forming system will be described taking a system color image forming apparatus as an example. However, the present invention is not limited thereto, and is also applicable to, for example, a monochrome image forming apparatus.

1. CONFIGURATION OF IMAGE FORMING SYSTEM

Figure 1:
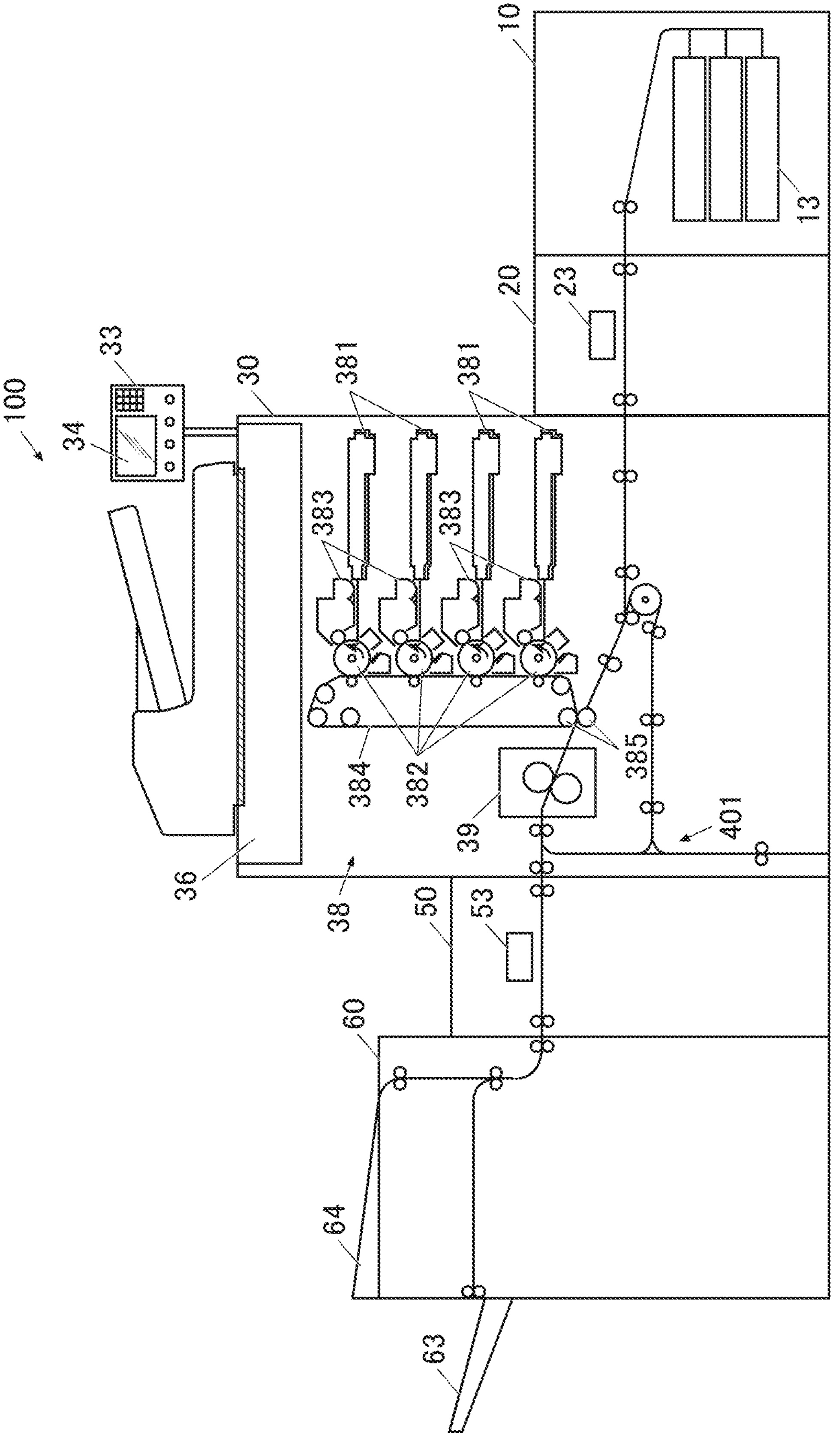
FIG. 1 is a diagram illustrating a schematic configuration of an image forming system according to the present embodiment.
Figure 2:
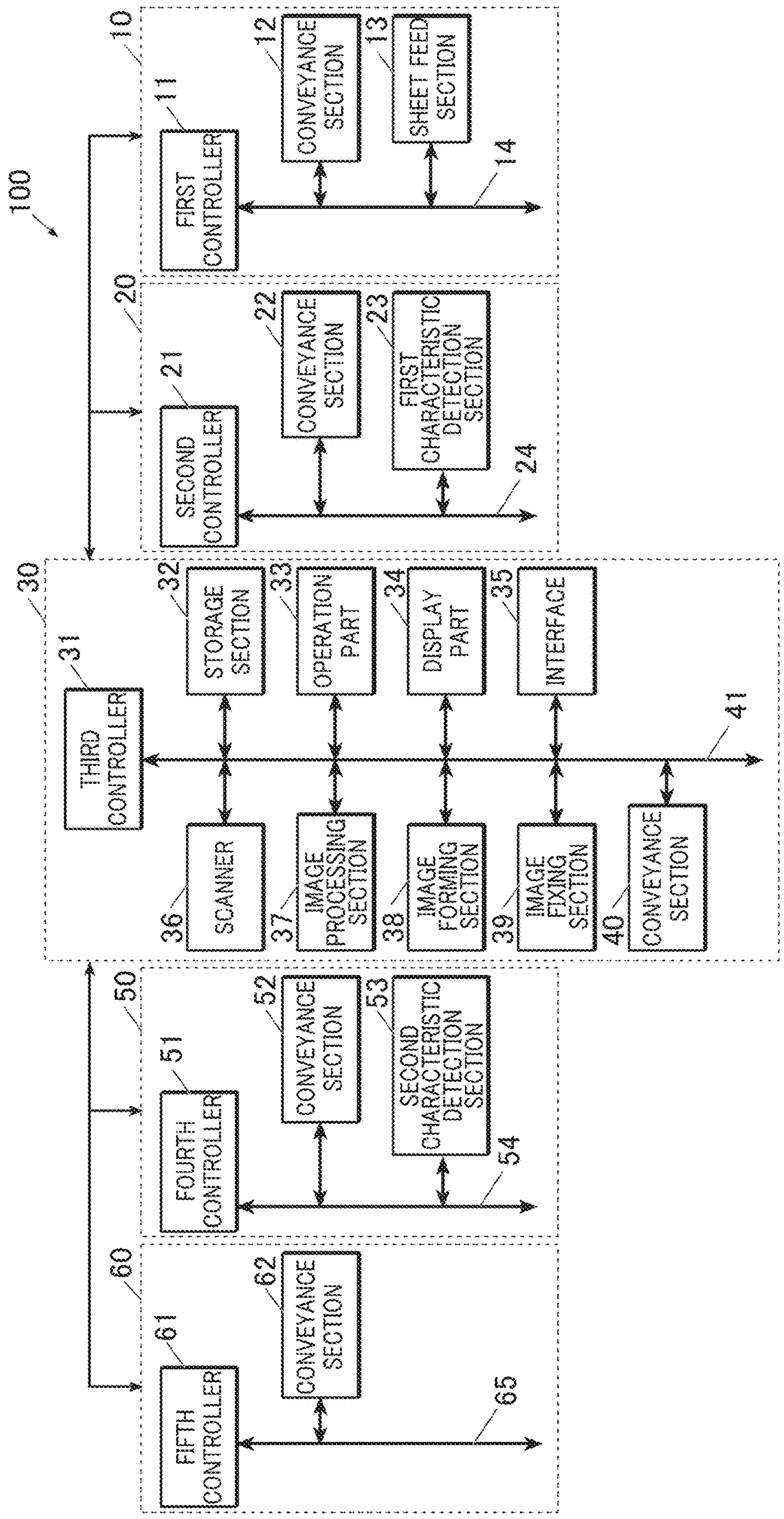
FIG. 2 is a block diagram illustrating a main functional configuration of the image forming system according to the present embodiment.

FIG. 1 is a diagram illustrating a schematic configuration of an image forming system 100 according to the present embodiment. FIG. 2 is a block diagram illustrating a main functional configuration of the image forming system 100. The image forming system 100 forms an image in a plurality of colors on a recording medium.

The recording medium is not particularly limited, and a known recording medium can be used. For example, the recording medium is paper such as plain paper or coated paper, or various media capable of fixing a coloring material attached to the surface of a sheet-shaped resin or the like. Hereinafter, it is assumed that the recording medium is a sheet.

An image forming system 100 according to the present embodiment includes a sheet feed device 10, a first detection device 20, an image forming apparatus 30, a second detection device 50, and a sheet ejection device 60.

In the image forming system 100, the sheet feed device 10, the first detection device 20, the image forming apparatus 30, the second detection device 50, and the sheet ejection device 60 are arranged in this order from the upstream along the conveyance direction of the sheet.

1-1. Configuration of Sheet Feed Device

The sheet feed device 10 includes a first controller 11, a conveyance section 12, and a sheet feed section 13.

The first controller 11 is connected to the conveyance section 12 and the sheet feed section 13 via a bus 14.

The first controller 11 includes a central processing unit (CPU), a read only memory (ROM), a random access memory (RAM), and the like.

The CPU of the first controller 11 reads a program stored in the ROM, deploys the program in the RAM, and integrally controls each section of the sheet feed device 10 according to the deployed program.

For example, the first controller 11 conveys a sheet from a sheet feed tray of any of the sheet feed sections 13 to the first detection device 20 according to a job.

The conveyance section 12 conveys a sheet through a conveyance path that connects the sheet feed section 13 to the first detection device 20.

The sheet feed section 13 includes sheet feed trays that store sheets by predetermined paper type and/or size.

1-2. Configuration of First Detection Device

The first detection device 20 is provided on the upstream side of the image forming apparatus 30 in the sheet conveyance direction, and detects the characteristics of the sheet conveyed from the sheet feed device 10.

The first detection device 20 includes a second controller 21, a conveyance section 22, and a first characteristic detection section 23 (first characteristic detector).

The second controller 21 is connected to the conveyance section 22 and the first characteristic detection section 23 via the bus 24.

The second controller 21 includes a CPU, a ROM, and a RAM.

The CPU of the second controller 21 reads a program stored in the ROM, develops the program in the RAM, and integrally controls each section of the first detection device 20 according to the developed program.

For example, the second controller 21 allows the first characteristic detection section 23 to detect the sheet conveyed from the sheet feed device 10. Next, the second controller 21 conveys the detected sheet to the image forming apparatus 30 by the conveyance section 22.

The conveyance section 22 includes a plurality of roller pairs and conveys the sheet conveyed from the sheet feed device 10 to the first characteristic detection section 23.

Next, the conveyance section 22 conveys the sheet detected by the first characteristic detection section 23 to the image forming apparatus 30.

The first characteristic detection section 23 is provided on a conveyance path on an upstream of an image forming section 38 (image former), which will be described later, of the image forming apparatus 30 in a sheet conveyance direction. The first characteristic detection section 23 detects the moisture amount of the sheet as a characteristic of the sheet before an image is formed by the image forming section 38.

Figure 3:
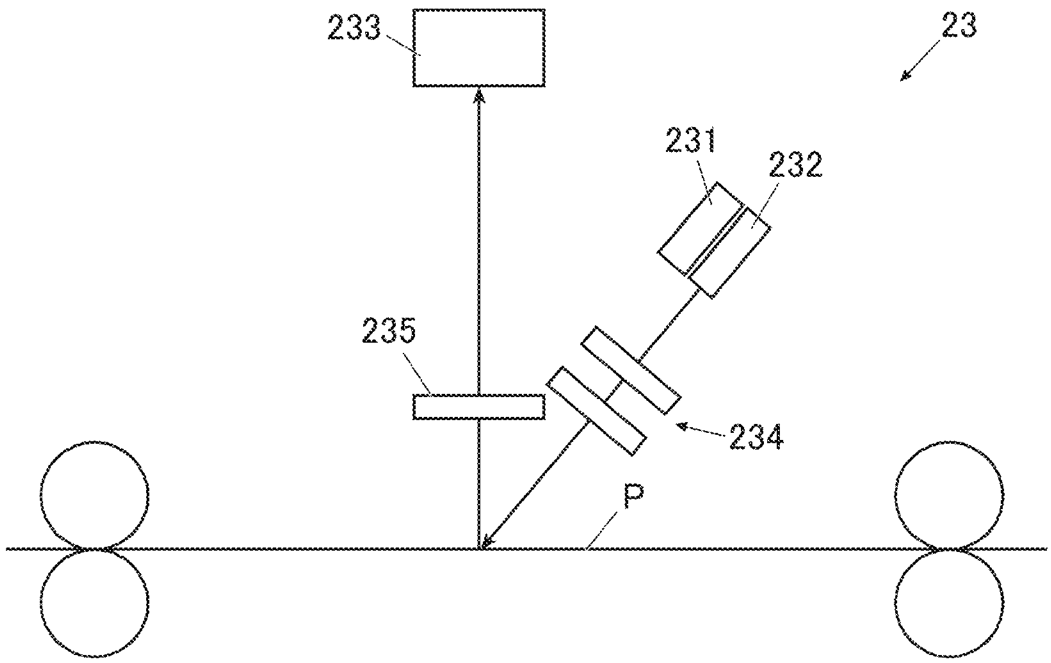
FIG. 3 is a diagram illustrating an example of a schematic configuration of a first characteristic detection section.

FIG. 3 is a schematic diagram illustrating a configuration of a first characteristic detection section 23.

As illustrated in FIG. 3, the first characteristic detection section 23 includes a first light emitting section 231, a second light emitting section 232, a light receiving section 233, and lenses 234 and 235.

The first light emitting section 231 emits first near-infrared light (reference light) in a specific wavelength band toward a sheet P. A specific example of first light emitting section 231 is an LED or the like.

The first near-infrared light is light for which the absorptance at the sheet P when the light is reflected off the sheet P does not depend on the moisture percentage of the sheet P.

The light receiving section 233 receives, via the lens 235, the first near-infrared light that has been emitted from the first light emitting section 231, passed through the lens 234, and reflected off the sheet P.

Specific examples of the light receiving section 233 include a charge-coupled device (CCD), a complementary metal-oxide-semiconductor (CMOS) image sensor, and the like.

The second light emitting section 232 emits second near-infrared light in a specific wavelength range toward the sheet P. Specific examples of the second light emitting section 232 include an LED and the like.

The second near-infrared light is light for which the absorptance at the sheet P when the light is reflected off the sheet P varies depending on the moisture percentage of the sheet P.

The light receiving section 233 receives, via the lens 235, the second near-infrared light emitted from the second light emitting section 232 and reflected by the sheet P via the lens 234.

The first characteristic detection section 23 detects the moisture amount in the sheet P on the basis of a ratio between the amount of the first near-infrared light received by the light receiving section 233 and the amount of the second near-infrared light received by the light receiving section 233.

The second controller 21 outputs the moisture amount (first moisture amount) of the sheet P detected by the first characteristic detection section 23 to the third controller 31.

The configuration of the first characteristic detection section 23 is not limited to the example illustrated in FIG. 3. The first characteristic detection section 23 may have any other configuration as long as it can detect the moisture amount in the sheet P.

1-3. Configuration of Image Forming Apparatus

The image forming apparatus 30 forms a color image by electrophotography on the basis of image data obtained by reading an image from a document or image data of a job received from an external device.

The image forming apparatus 30 includes a third controller 31 (i.e., a hardware processor), a storage section 32, an operation part 33, a display part 34, an interface 35, a scanner 36, an image processing section 37, an image forming section 38, an image fixing section 39, a conveyance section 40, and the like.

The third controller 31 is connected to the storage section 32, the operation part 33, the display part 34, the interface 35, the scanner 36, the image processing section 37, the image forming section 38, the image fixing section 39, and the conveyance section 40 via a bus 41.

The third controller 31 includes a CPU, a ROM, and a RAM.

The CPU of the third controller 31 reads a control program stored in the ROM, develops the control program in the RAM, and integrally controls each section of the image forming apparatus 30 according to the developed program.

For example, the third controller 31 causes the image processing section 37 to perform predetermined image processing on image data and causes the storage section 32 to store the image data. Next, the third controller 31 causes the conveyance section 40 to convey a sheet, and causes the image forming section 38 to form an image on the sheet on the basis of the image data stored in the storage section 32.

The storage section 32 includes a dynamic random access memory (DRAM) which is a semiconductor memory, a hard disk drive (HDD), and the like.

The storage section 32 stores image data acquired by the scanner 36, image data input from the outside via the interface 35, and the like. These image data and the like may be stored in the RAM included in the third controller 31.

The operation part 33 includes an input device such as operation keys and a touch panel arranged to overlap the screen of the display part 34.

The operation part 33 converts an input operation to these input devices into an operation signal, and outputs the operation signal to the third controller 31.

The display part 34 includes a display device such as a liquid crystal display (LCD), and displays a state of the image forming system 100, an operation screen indicating content of an input operation to the touch panel, and the like.

The interface 35 transmits and receives data to and from an external computer, another image forming apparatus, or the like.

The interface 35 includes, for example, any of various serial interfaces.

The scanner 36 reads an image formed on a sheet, generates image data including single-color image data for each color component of red (R), green (G), and blue (B), and stores the image data in the storage section 32.

The image processing section 37 includes, for example, a rasterization processing section, a color conversion section, a tone correction section, and a halftone processing section.

The image processing section 37 performs various kinds of image processing on image data stored in the storage section 32 and stores the image data in the storage section 32.

The image forming section 38 forms an image on a sheet on the basis of image data stored in the storage section 32.

The image forming section 38 includes four sets of an exposure section 381, a photosensitive drum 382, and a developing section 383 corresponding to color components of cyan (C), magenta (M), yellow (Y), and black (K), respectively. The image forming section 38 includes the transfer body 384 and a secondary transfer roller 15.

The exposure section 381 includes laser diodes (LDs) as light emitting elements.

The exposure section 381 drives an LD based on image data and irradiates the charged photosensitive drum 382 with laser light for exposure, thereby forming an electrostatic latent image on the photosensitive drum 382.

The developing section 383 develops the electrostatic latent image formed on the photosensitive drum 382 by supplying toner (coloring material) of a predetermined color onto the exposed photosensitive drum 382 by a charged developing roller. The predetermined color is any one of C, M, Y, and K.

The image forming section 38 sequentially transfers images (single-color images) formed on the four photosensitive drums 12 with toners of C, M, Y, and K from the respective photosensitive drums 12 onto the transfer body 384 in a superimposed manner. Thus, the image forming section 38 forms a color image in which C, M, Y, and K are color components on the transfer body 384. The transfer body 384 is an endless belt wound around a plurality of transfer body conveyance rollers, and rotates in accordance with the rotation of each of the transfer body conveyance rollers.

The secondary transfer roller 385 transfers the color image on the transfer body 384 onto a sheet fed from the sheet feed device 10. More specifically, a transfer nip section formed by the pair of secondary transfer rollers 385 in pressure contact with each other nips the sheet and the transfer body 384. In addition, the image forming section 38 applies a predetermined transfer voltage to the secondary transfer roller 385. Thus, the image forming section 38 transfers the color image formed on the transfer body 384 onto the sheet.

The image fixing section 39 includes a fixing roller and a pressure roller and performs fixing processing in which the sheet on which the color image has been transferred is heated and pressurized to fix the color image on the sheet.

The conveyance section 40 includes a plurality of sheet conveyance rollers that convey a sheet by rotating while pinching the sheet, and conveys the sheet along a predetermined conveyance path.

The conveyance section 40 includes a reversing mechanism 401 that reverses the front and back of the sheet subjected to the fixing processing by the image fixing section 39 and conveys the sheet to the secondary transfer roller 385.

In a case of forming images on both sides of the sheet, the conveyance section 40 reverses the front and back of the sheet by the reversing mechanism 401, and ejects the sheet after the images are formed on both sides. When an image is formed on only one side of the sheet, the conveyance section 40 does not invert the front and back of the sheet by the inversion mechanism 401, and ejects the sheet having the image formed on one side.

1-4. Configuration of Second Detection Device

The second detection device 50 is provided on a downstream side of the image forming apparatus 30 in a sheet conveyance direction, and detects the sheet conveyed from the image forming apparatus 30.

The second detection device 50 includes a fourth controller 51, a conveyance section 52, and a second characteristic detection section 53 (second characteristic detector).

The fourth controller 51 is connected to the conveyance section 52 and the second characteristic detection section 53 via the bus 54.

The fourth controller 51, the conveyance section 52, and the second characteristic detection section 53 have the same configurations as the second controller 21, the conveyance section 22, and the first characteristic detection section 23, respectively, and thus description thereof will be omitted.

The second characteristic detection section 53 is provided on a conveyance path on a downstream of the image forming section 38 in a sheet conveyance direction. The second characteristic detection section 53 detects the moisture amount of the sheet as a characteristic of the sheet after the image is formed by the image forming section 38.

The moisture amount of the sheet P detected by the second characteristic detection section 53 is a second moisture amount.

1-5. Configuration of Sheet Ejection Device 60

The sheet ejection device 60 is provided on the downstream side of the second detection device 50 in the sheet conveyance direction, and ejects the sheet conveyed from the second detection device 50.

The sheet ejection device 60 includes a fifth controller 61, a conveyance section 62, a first tray 63, and a second tray 64.

The fifth controller 61 is connected to the conveyance section 62 via the bus 65.

The fifth controller 61 includes a CPU, a ROM, and a RAM.

The CPU of the fifth controller 61 reads a program stored in the ROM, develops the program in the RAM, and integrally controls each section of the sheet ejection device 60 according to the developed program.

The conveyance section 62 includes a plurality of roller pairs.

Under the control of the fifth controller 61, the conveyance section 62 conveys the sheet conveyed from the second detection device 50 to the first tray 63 or the second tray 64.

In the present embodiment, the third controller 31 of the image forming apparatus 30 integrally controls the entire image forming system 100, but the present invention is not limited thereto. The second controller 21 of the first detection device 20 or the fourth controller 51 of the second detection device 50 may comprehensively control the entire image forming system 100.

2. OPERATIONS BY IMAGE FORMING SYSTEM

Next, operations by the image forming system 100 will be described.

The third controller 31 of the image forming apparatus 30 executes detection control processing when receiving image data and setting information of a print job via the operation part 33 or the interface 35.

Figure 4:
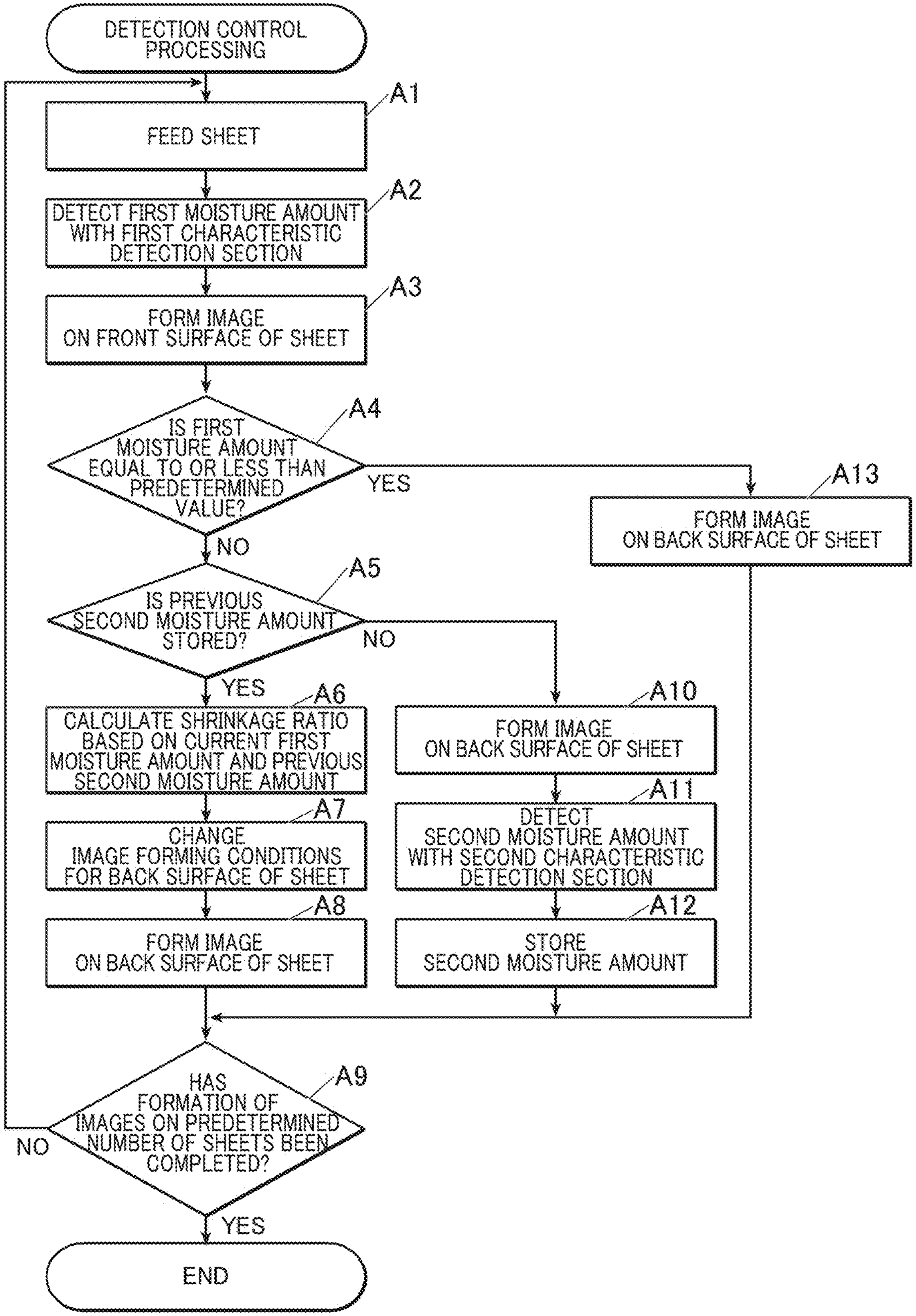
FIG. 4 is a flowchart illustrating a flow of detection control processing executed by the image forming system.

FIG. 4 is a flowchart illustrating a flow of the detection control processing.

The CPU of the third controller 31 of the image forming apparatus 30 cooperates with the control program stored in the ROM to execute the detection control processing.

2-1. Detection Control Processing

The third controller 31 causes the sheet feed device 10 to feed a sheet on which an image is to be formed in the print job from the sheet feed section 13 and convey the sheet to the first detection device 20 (step A1).

Next, the third controller 31 detects, with the first characteristic detection section 23, the first moisture amount of the sheet fed in step A1 on the conveyance path (step A2).

Next, the third controller 31 causes the image forming section 38 to form a job image of the print job on the front surface of the sheet fed in step A1 (step A3).

Next, the third controller 31 determines whether the first moisture amount detected in step A2 is equal to or less than a predetermined threshold value (step A4). The predetermined threshold value is set in advance.

The case where the first moisture amount is the predetermined threshold value or less is the case where it is estimated that the moisture amount of the sheet does not change before and after the image forming processing by the image forming section 38. This is, for example, a case where the moisture amount of the sheet is small before the image forming processing, and thus the moisture amount of the sheet is unlikely to change even when the fixing processing is performed. In this case, even if the image forming processing and the fixing processing are performed, shrinkage of the sheet does not easily occur.

A case where the first moisture amount is more than the predetermined threshold value (step A4; NO) will be described. In this case, the third controller 31 determines whether or not the second moisture amount detected when an image was formed previous time (the previous second moisture amount) is stored in the storage section 32 (step A5).

A case where the previous second moisture amount is stored (step A5; YES) will be described. In this case, the third controller 31 calculates, based on the current first moisture amount and the previous second moisture amount detected in step A2, the shrinkage ratio of the sheet before and after images are formed on both sides of the sheet (step A6).

Next, the third controller 31 changes the image forming conditions for the back surface of the sheet on the basis of the shrinkage ratio of the sheet calculated in step A6 (step A7).

Next, the third controller 31 causes the image forming section 38 to form a job image of the print job on the back surface of the sheet fed in step A1, using the image forming conditions changed in step A7 (step A8).

Next, the third controller 31 determines whether or not formation of images of the number of print sheets (predetermined number of sheets) set in the print job has been completed (step A9).

When the formation of the predetermined number of images is completed (step A9; YES), the third controller 31 ends the detection control processing.

In a case where the formation of the predetermined number of images is not completed (step A9; NO), the third controller 31 causes the detection control processing to proceed to step A1.

A case where the previous second moisture amount is not stored (step A5; NO) will be described. In this case, the third controller 31 causes the image forming section 38 to form a job image of the print job on the back surface of the sheet fed in step A1 (step A10).

Next, the third controller 31 detects the second moisture amount of the sheet after the image is formed on the back surface in step A10 by the second characteristic detection section 53 (step A11).

Next, the third controller 31 stores the second moisture amount detected in step A11 in the storage section 32 (step A12), and shifts the detection control processing to step A9.

A case where the first moisture amount is equal to or less than the predetermined threshold value (step A4; YES) will be described. In this case, the third controller 31 forms, by the image forming section 38, a job image of the print job on the back surface of the sheet fed in step A1 (step A13), and shifts the detection control processing to step A9.

In step A5 of the detection control processing, the third controller 31 may determine whether the second moisture amount detected when an image is formed in the print job currently being executed is stored in the storage section 32.

A case where the second moisture amount detected when an image is formed in the print job currently being executed is stored will be described. In this case, the third controller 31 calculates the shrinkage ratio of the sheet before and after images are formed on both sides of the sheet, based on the current first moisture amount detected in step A2 and the second moisture amount detected in the print job currently being executed.

As described above, when the result of detection by the first characteristic detection section 23 is a predetermined threshold value or less, the third controller 31 controls the second characteristic detection section 53 not to perform detection. The detection result of the first characteristic detection section 23 is information corresponding to the moisture amount detected by the first characteristic detection section 23.

Thus, the number of times of detection by the second characteristic detection section 53 can be reduced. That is, the number of times of light emission of the light emitting section for detecting the moisture amount can be reduced, and the life of the light emitting section can be extended.

As described above, the third controller 31 controls the second characteristic detection section 53 based on the detection result of the first characteristic detection section 23 by executing the detection control processing. The third controller 31 functions as a controller.

3 MODIFICATION EXAMPLES

3-1. Modification Example 1

Next, modification example 1 of the present invention will be described. In the modification example 1, the same components as those in the embodiment described above are denoted by the same reference numerals, and description thereof is omitted.

Figure 5:
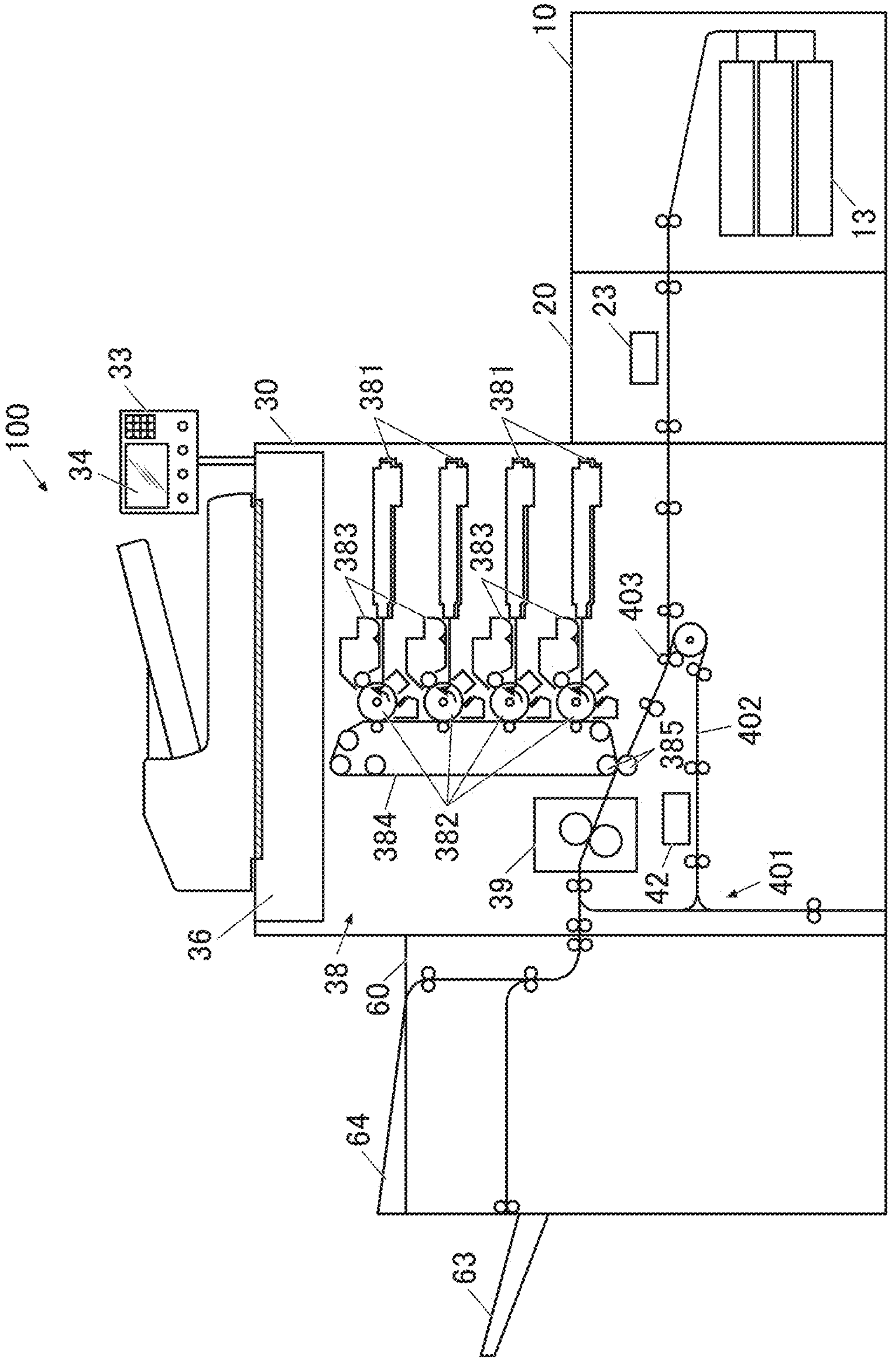
FIG. 5 is a diagram illustrating a schematic configuration of an image forming system of modification example 1.
Figure 6:
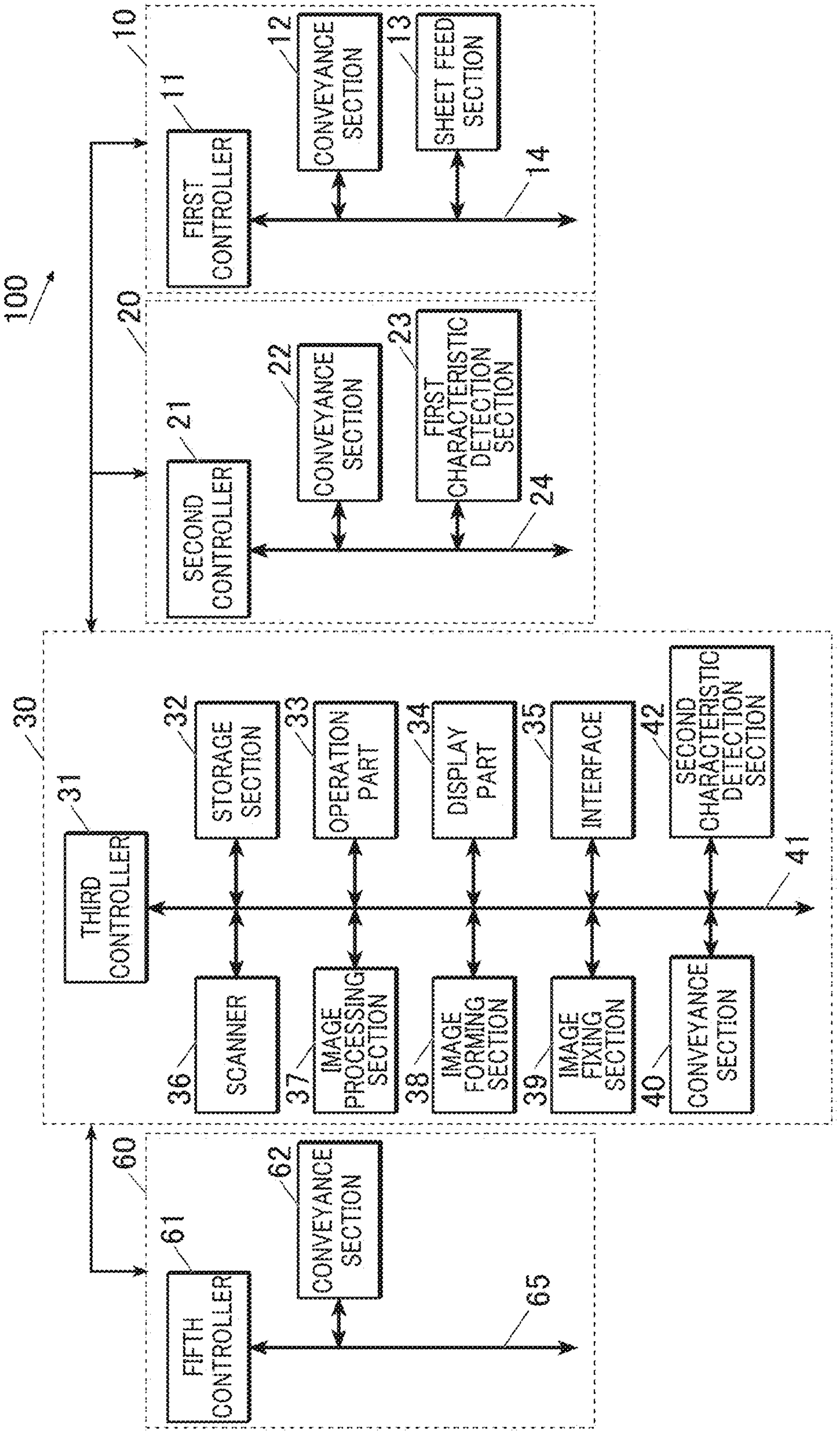
FIG. 6 is a block diagram illustrating a main functional configuration of an image forming system of modification example 1.

FIG. 5 is a diagram illustrating a schematic configuration of an image forming system 100 of the present modification example. FIG. 6 is a block diagram illustrating a main functional configuration of an image forming system 100 of the present modification example.

In the present modification example, instead of including the second detection device 50 in the image forming system 100, the image forming apparatus 30 includes a second characteristic detection section 42 (second characteristic detector).

The second characteristic detecting section 42 is disposed on the downstream side of the image fixing section 39 in the sheet conveyance direction and on the upstream side of the position of the leading end of the sheet at the start of the exposure of the back surface image by the image forming section 38. The back surface image is an image to be formed on a back surface of the sheet. In other words, the second characteristic detection section 42 is disposed on the sheet re-feeding path 402 of the conveyance section 40 and on the upstream side of the registration roller pair 403 of the conveyance section 40 in the sheet conveying direction.

Figure 7:
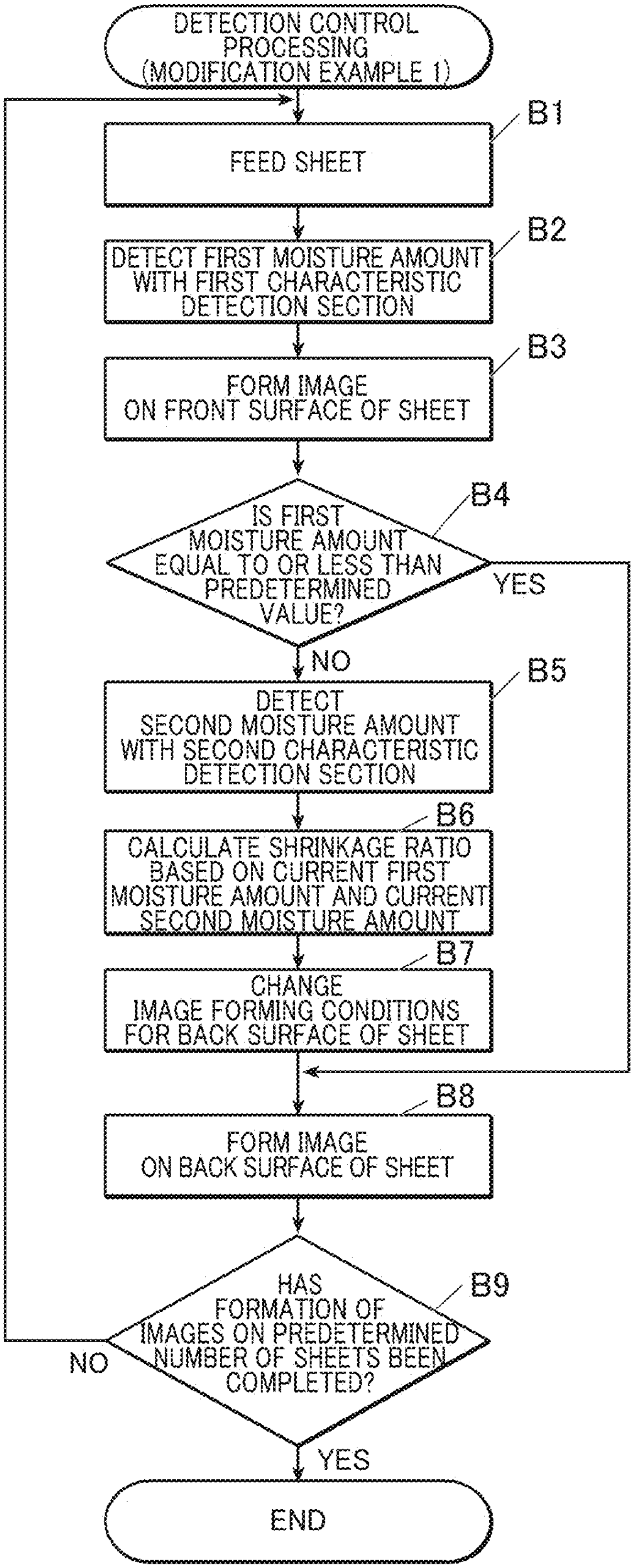
FIG. 7 is a flowchart illustrating a flow of detection control processing executed by the image forming system according to the modification example 1.

FIG. 7 is a flowchart illustrating a flow of detection control processing of the present modification example.

Detection Control Processing of Modification Example 1

The third controller 31 performs steps B1 to B4 similar to the detection control processing steps A1 to A4 of the above-described embodiment.

A case where the first moisture amount is greater than the predetermined threshold value (step B4; NO) will be described. In this case, the third controller 31 causes the second characteristic detection section 42 to detect the second moisture amount of the sheet after the image is formed on the front surface of the sheet in step B3 (step B5).

Next, based on the current first moisture amount detected in step B2 and the current second moisture amount detected in step B5, the third controller 31 calculates the shrinkage ratio of the sheet before and after the formation of the image on the front surface of the sheet (step B6).

Next, the third controller 31 performs steps B7 to B9 similar to the detection control processing steps A7 to A9 of the above-described embodiment.

When the first moisture amount is equal to or less than the predetermined threshold value (step B4; YES), the third controller 31 shifts the detection control processing of modification example 1 to step B8.

That is, when the detection result of the first characteristic detection section 23 is equal to or less than the predetermined threshold value, the third controller 31 controls the second characteristic detection section 42 not to perform detection. The detection result of the first characteristic detection section 23 is information corresponding to the moisture amount detected by the first characteristic detection section 23.

Thus, the number of times of detection by the second characteristic detection section 42 can be reduced.

3-2. Modification Example 2

Next, modification example 2 of the present invention will be described. In the modification example 2, the same components as those in the modification example 1 of the embodiment are denoted by the same reference numerals, and description thereof is omitted.

The configuration of the image forming system 100 of modification example 2 is similar to the configuration of the image forming system 100 of modification example 1.

Figure 8:
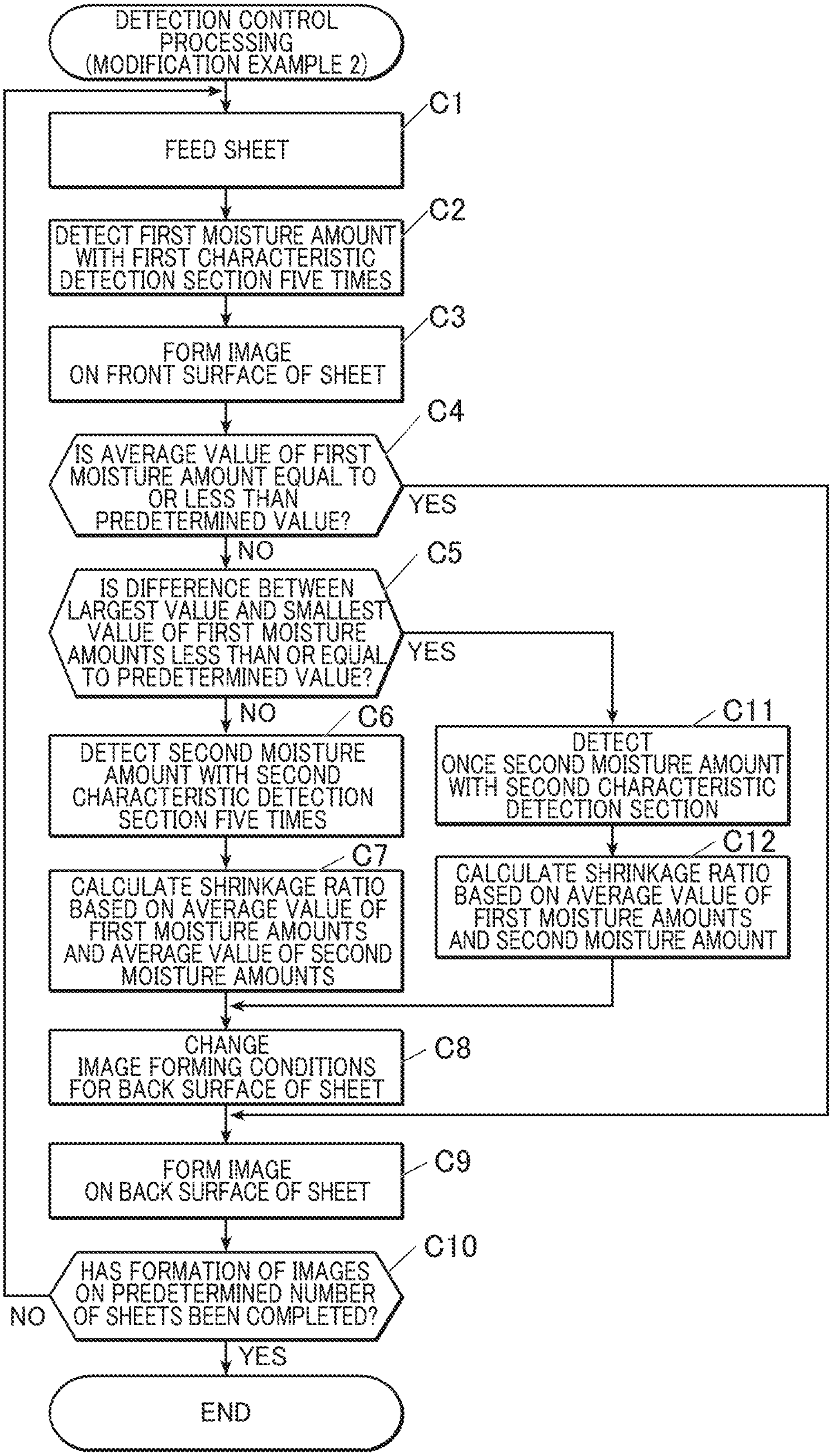
FIG. 8 is a flowchart illustrating a flow of detection control processing executed by the image forming system according to the modification example 2.

FIG. 8 is a flowchart illustrating a flow of detection control processing of the present modification example.

Detection Control Processing of Modification Example 2

The third controller 31 executes step C1 similar to the detection control processing step B1 of the modification example 1 described above.

Next, the third controller 31 causes the first characteristic detection section 23 to detect the first moisture amount five times for one sheet on the conveyance path fed in Step C1 (Step C2).

In step C2, the third controller 31 detects the first moisture amount at each of different positions on one sheet. The different positions on the sheet are a leading end section, a central section, a trailing end section, and the like of the sheet.

Next, the third controller 31 performs step C3 similar to the detection control processing step B3 of modification example 1 described above.

Next, the third controller 31 determines whether the average value of the first moisture amounts detected five times in step C2 is equal to or less than a predetermined threshold value (step C4).

The case where the average of the first moisture amounts is more than the predetermined threshold value (step C4; NO) will be described. In this case, the third controller 31 determines whether the difference between the largest value and the smallest value of the first moisture amounts detected five times in step C2 is less than or equal to a predetermined value (step C5). The predetermined value is set in advance.

The case where the difference between the largest value and the smallest value of the first moisture amount is larger than the predetermined value (step C5; NO) will be described. In this case, the third controller 31 causes the second characteristic detection section 42 to detect the second moisture amount of the sheet five times after the image is formed on the front surface of the sheet in step C3 (step C6).

In step C6, the third controller 31 detects the second moisture amount at each of different positions on the one sheet. The different positions on the sheet are a leading end section, a central section, a trailing end section, and the like of the sheet.

Next, based on the average value of the first moisture amounts detected in step C2 and the average value of the second moisture amounts detected in step C6, the third controller 31 calculates the shrinkage ratio of the sheet before and after the formation of the image on the front surface of the sheet (step C7).

Next, the third controller 31 performs steps C8 to C10 similar to the detection control processing steps B7 to B9 of modification example 1 described above.

A case where the difference between the largest value and the smallest value of the first moisture amount is equal to or less than the predetermined value (step C5; YES) will be described. In this case, the third controller 31 causes the second characteristic detection section 42 to detect once the second moisture amount of the sheet after the image is formed on the front surface of the sheet in step C3 (step C11).

That is, when a variation in the results of detection performed a plurality of times by the first characteristic detection section 23 is a predetermined value or less, the third controller 31 makes the number of times of detection by the second characteristic detection section 42 less than a predetermined number of times of detection.

If the variation in the results of detection performed a plurality of times by the first characteristic detection section 23 is equal to or less than the predetermined value, it is estimated that the variation in the results of detection by the second characteristic detection section 42 is also small. Therefore, it is not necessary to perform detection by the second characteristic detection section 42 a plurality of times.

Thus, the number of times of detection by the second characteristic detection section 42 can be reduced.

Next, the third controller 31 calculates, based on the average value of the first moisture amounts detected in step C2 and the second moisture amount detected in step C11, the shrinkage ratio of the sheet before and after the formation of the image on the front surface of the sheet (step C12). Next, the third controller 31 proceeds to step C8 in the detection control processing of modification example 2.

If the average value of the first moisture amounts is equal to or less than the predetermined threshold value (step C4; YES), the third controller 31 proceeds to step C9 in the detection control process of modification example 2.

That is, when the detection result of the first characteristic detection section 23 is equal to or less than the predetermined threshold value, the third controller 31 controls the second characteristic detection section 42 not to perform detection. The detection result of the first characteristic detection section 23 is information corresponding to the moisture amount detected by the first characteristic detection section 23. Specifically, the detection result of the first characteristic detection section 23 is an average value of the moisture amounts detected by the first characteristic detection section 23.

Thus, the number of times of detection by the second characteristic detection section 42 can be reduced.

3-3. Modification Example 3

Next, a modification example 3 of the present invention will be described. In the modification example 3, the same components as those in the modification example 2 of the embodiment are denoted by the same reference numerals, and description thereof is omitted.

The configuration of the image forming system 100 of modification example 3 is the same as the configuration of the image forming system 100 of modification example 1.

Figure 9:
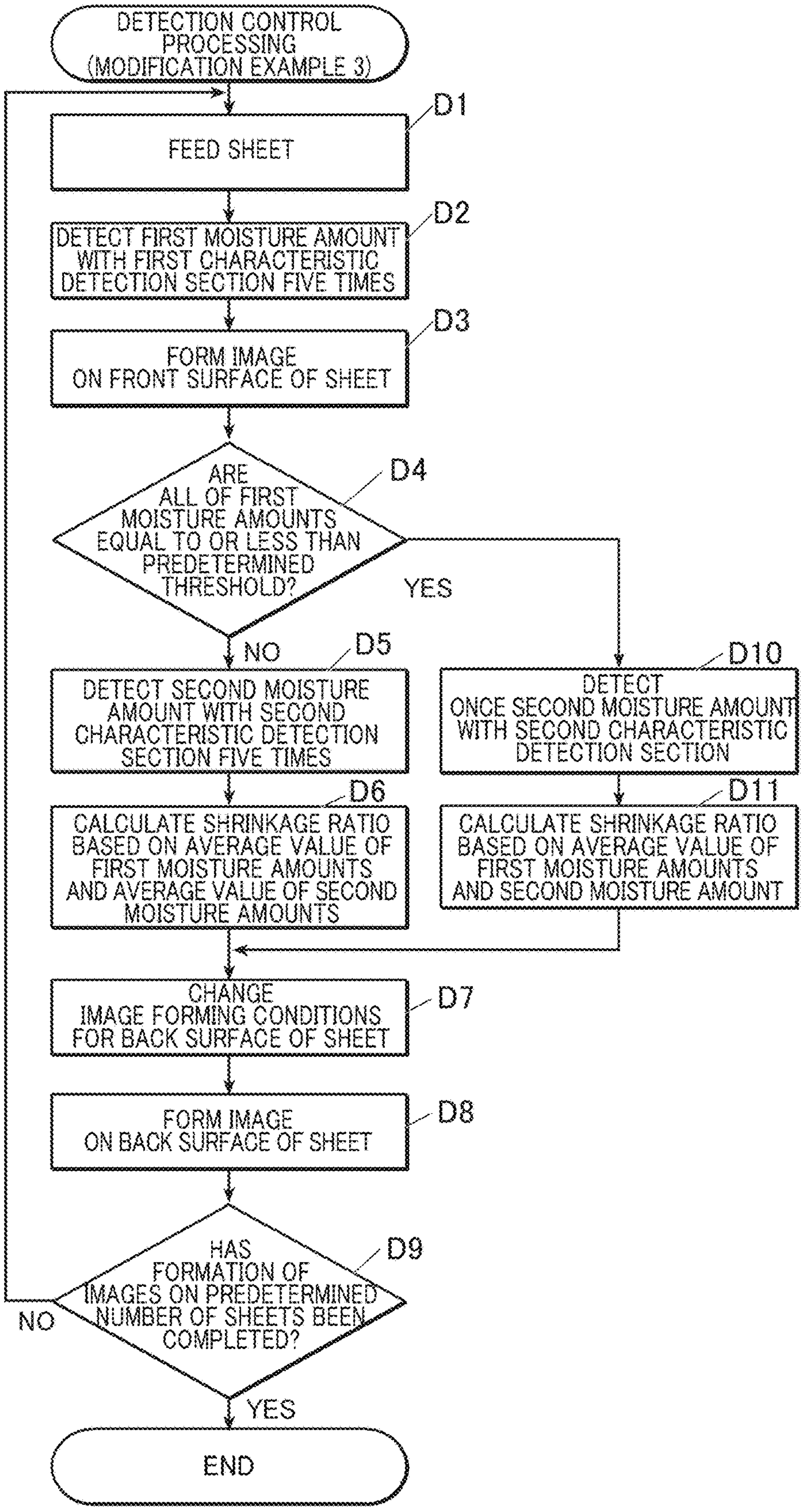
FIG. 9 is a flowchart illustrating a flow of detection control processing executed by an image forming system according to a modification example 3.

FIG. 9 is a flowchart illustrating a flow of detection control processing of the present modification example.

Detection Control Processing of Modification Example 3

The third controller 31 performs steps D1 to D3 similar to the detection control processing steps C1 to C3 of modification example 2 described above.

Next, the third controller 31 determines whether all of the first moisture amounts detected five times in step D2 are equal to or less than predetermined threshold values (step D4).

A case where there is a first moisture amount larger than the predetermined threshold value among the first moisture amounts detected five times in Step D2 (Step D4; NO) will be described. In this case, the third controller 31 executes steps D5 to D9 similar to the detection control processing steps C6 to C10 of the modification example 2 described above.

A case where all of the first moisture amounts detected five times in step D2 are equal to or less than the predetermined threshold value (step D4; YES) will be described. In this case, the third controller 31 performs steps D10 and D11 similar to the detection control processing steps C11 and C12 of modification example 2 described above, and shifts the detection control processing of modification example 3 to step D7.

That is, if all of the results of detection performed by the first characteristic detection section 23 a plurality of times are less than or equal to the predetermined value, the third controller 31 makes the number of times of detection by the second characteristic detection section 42 less than a predetermined number of times of detection.

Thus, the number of times of detection by the second characteristic detection section 42 can be reduced.

4 OTHERS

The above description of the embodiment and the modification examples is examples of the image forming system according to the present invention, and the present invention is not limited thereto.

For example, although the first characteristic detection section 23 and the second characteristic detection sections 42, 53 detect the moisture amount in the sheet as the characteristic information corresponding to the characteristic of the sheet in the embodiment and the modification examples described above, it is not limited thereto.

The first characteristic detection section 23 and the second characteristic detection sections 42, 53 may detect a resistance value, stiffness, and the like of the sheet as the characteristic information corresponding to the characteristics of the sheet. In particular, in detection of a resistance value or stiffness of the sheet, accuracy in detection may be increased by performing measurement while the sheet is stopped or the conveyance speed is reduced. However, stopping the sheet or reducing the conveyance speed leads to a reduction in productivity. Even in these detection sensors, there is a possibility that the service life is reduced depending on the use situation due to an electrical or mechanical load.

In the detection control processing of the above-described embodiment and modification examples, the third controller 31 controls the second characteristic detection sections 42, 53 based on the detection result of the first characteristic detection section 23, but the present invention is not limited thereto. The third controller 31 may control the first characteristic detection section 23 based on the detection results of the second characteristic detection sections 42, 53.

In the embodiment and the modification examples described above, the third controller 31 functions as the controller to control the second characteristic detection section 42, 53 based on the detection result of the first characteristic detection section 23, but it is not limited thereto. An external device capable of communicating with the image forming system 100 may function as the controller.

5. EFFECTS

As described above, the image forming system 100 of the present embodiment includes the image forming section 38 that forms an image on a recording medium (sheet).

The image forming system 100 of the present embodiment includes the first characteristic detection section 23 that is provided on the upstream side of the image forming section 38 in the conveyance direction of the recording medium and detects characteristic information corresponding to a characteristic of the recording medium.

The image forming system 100 according to the present embodiment includes the second characteristic detection sections 42, 53 that are provided on the downstream side of the image forming section 38 in the conveyance direction of the recording medium and detect the characteristic information.

In the image forming system 100 according to the present embodiment, based on a detection result of one of the first characteristic detection section 23 and the second characteristic detection section 42, the other characteristic detection section is controlled. Alternatively, based on a detection result of one of the first characteristic detection section 23 and the second characteristic detection section 53, the other characteristic detection section is controlled.

Thus, the number of times of detection by the first characteristic detection section 23 or the second characteristic detection section 42, 53 can be reduced. Therefore, it is possible to prevent a reduction in lifetime or productivity of the detection section for detecting a characteristic of the sheet.

In the image forming system 100 of the present embodiment, the second characteristic detection sections 42, 53 are controlled based on the detection result of the first characteristic detection section 23.

Thus, the number of times of detection by the second characteristic detection sections 42, 53 can be reduced.

In the image forming system 100 according to the present embodiment, the characteristic information is information corresponding to at least one of the moisture amount, the resistance, and the stiffness of the recording medium (sheet).

Thus, the number of times of detection by the first characteristic detection section 23 or the second characteristic detection sections 42, 53 can be appropriately reduced on the basis of at least one of the moisture amount, the resistance, and the stiffness of the sheet.

The image forming system 100 of the present embodiment includes the controller (the third controller 31) that controls the second characteristic detection section 42, 53 based on the detection result of the first characteristic detection section 23.

Thus, the number of times of detection by the second characteristic detection section 42, 53 can be reduced.

The controller (third controller 31) in the image forming system 100 of the present embodiment calculates the shrinkage ratio of the recording medium (sheet) based on the detection results of the first characteristic detection section 23 and the second characteristic detection section 42.

Alternatively, the controller (third controller 31) in the image forming system 100 of the present embodiment calculates the shrinkage ratio of the recording medium (sheet) based on the detection results of the first characteristic detection section 23 and the second characteristic detection section 53.

Thus, the shrinkage ratio of the sheet before and after the image forming processing by the image forming section 38 can be appropriately calculated.

The controller (third controller 31) in the image forming system 100 of the present embodiment controls the image forming conditions of the image forming section 38 based on the shrinkage ratio of the recording medium (sheet).

Thus, appropriate image forming conditions can be set based on the shrinkage ratio of the sheet before and after the image forming processing by the image forming section 38.

The controller (the third controller 31) in the image forming system 100 of the present embodiment performs control such that the second characteristic detection sections 42, 53 do not perform detection, according to the detection result of the first characteristic detection section 23.

Thus, the number of times of detection by the second characteristic detection section 42, 53 can be reduced.

The controller (the third controller 31) in the image forming system 100 of the present embodiment controls the second characteristic detection section 42, 53 not to perform detection if the detection result of the first characteristic detection section 23 is a predetermined threshold value or less.

Thus, the number of times of detection by the second characteristic detection section 42, 53 can be reduced, for example, in a case where shrinkage of the sheet is unlikely to occur even after the image forming processing and the fixing processing are performed.

In the image forming system 100 of the present embodiment, the characteristic information is information corresponding to the moisture amount of the recording medium.

When the information corresponding to the moisture amount detected by the first characteristic detection section 23 is equal to or less than the predetermined threshold value, the controller (third controller 31) controls the second characteristic detection sections 42, 53 not to perform detection.

Thus, the number of times of detection by the second characteristic detection section 42, 53 can be reduced, for example, in a case where shrinkage of the sheet is unlikely to occur even after the image forming processing and the fixing processing are performed.

The controller (third controller 31) in the image forming system 100 of the present embodiment changes the detection method by the second characteristic detection section 42 according to the detection result of the first characteristic detection section 23.

Thus, the number of times of detection by the second characteristic detection section 42 can be reduced by changing the detection method.

In the image forming system 100 of the present embodiment, the characteristic information is information corresponding to the moisture amount of the recording medium.

The controller (third controller 31) changes the method of detection by the second characteristic detection section 42 according to the information corresponding to the moisture amount detected by the first characteristic detection section 23.

Thus, the number of times of detection by the second characteristic detection section 42 can be reduced, for example, in a case where shrinkage of the sheet is unlikely to occur even after the image forming processing and the fixing processing are performed.

The controller (the third controller 31) in the image forming system 100 of the present embodiment changes the frequency of detection by the second characteristic detection section 42 as the change of the detection method.

Thus, the number of times of detection by the second characteristic detection section 42 can be reduced.

The controller (third controller 31) in the image forming system 100 of the present embodiment changes the detection position on the recording medium (sheet) by the second characteristic detection section 42 as the change of the detection method.

In a case where the number of times of detection by the second characteristic detection section 42 is reduced, the detection position by the second characteristic detection section 42 changes.

The first characteristic detection section 23 and the second characteristic detection section 42 in the image forming system 100 according to the present embodiment can detect characteristic information on one recording medium a plurality of times.

As the change in the detection method, the controller (third controller 31) changes the number of times of detection of the one recording medium by the second characteristic detection section 42.

Thus, the number of times of detection by the second characteristic detection section 42 can be reduced.

The controller (third controller 31) in the image forming system 100 of the present embodiment makes the number of times of detection by the second characteristic detection section 42 less than a predetermined number of times of detection in a case where a variation in the results of detection performed a plurality of times by the first characteristic detection section 23 is a predetermined value or less.

Thus, when the second characteristic detection section 42 does not needs to perform detection a plurality of times, the number of times of detection by the second characteristic detection section 42 can be reduced. This is the case where the variation in the results of detection performed a plurality of times by the first characteristic detection section 23 is equal to or less than the predetermined value and the variation in the results of detection by the second characteristic detection section 42 is also estimated to be small.

In a case where all of the results of detection performed by the first characteristic detection section 23 a plurality of times are less than or equal to the predetermined threshold value, the controller (third controller 31) in the image forming system 100 of the present embodiment reduces the number of times of detection by the second characteristic detection section 42 to less than a predetermined number of times of detection.

Thus, the number of times of detection by the second characteristic detection section 42 can be reduced, for example, in a case where shrinkage of the sheet is unlikely to occur even after the image forming processing and the fixing processing are performed.

The descriptions in the above embodiment and modification examples are examples of the image forming system, the control method, and the control program according to the present invention, and the present invention is not limited thereto. The detailed configuration and detailed operation of each section constituting each device included in the image forming system can also be appropriately changed without departing from the spirit of the present invention.

For example, in the embodiment and modification examples described above, the light receiving section 233 receives the light emitted from the first light emitting section 231 and the second light emitting section 232 and reflected off the sheet P, but the present invention is not limited thereto. The light receiving section 233 may be configured to receive light that is emitted from the first light emitting section 231 and the second light emitting section 232 and then transmitted through the sheet P.

For example, in the above-described embodiment, the present invention is applied to the image forming apparatus 30 in which the printing method is the electrophotographic method. The present invention can also be applied to an image forming apparatus of an inkjet method or an image forming apparatus of another printing method in which a shrinkage ratio of a sheet occurs before and after printing.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-141008 filed on Aug. 31, 2023 is incorporated herein by reference in its entirety.

What is claimed is:

1. An image forming system comprising:
- an image former that forms an image on a recording medium;
  - a first characteristic detector that is provided on an upstream side of the image former in a conveyance direction of the recording medium and detects characteristic information corresponding to a characteristic of the recording medium; and
  - a second characteristic detector that is provided on a downstream side of the image former in the conveyance direction of the recording medium and detects the characteristic information, wherein
  - based on a detection result of one characteristic detector that is one of the first characteristic detector and the second characteristic detector, the other characteristic detector of the first characteristic detector and the second characteristic detector is controlled.

2. The image forming system according to claim 1, wherein the second characteristic detector is controlled based on a detection result of the first characteristic detector.

3. The image forming system according to claim 1, wherein the characteristic information is information corresponding to at least one of a moisture amount, a resistance, and a stiffness of the recording medium.

4. The image forming system according to claim 1, further comprising a hardware processor that controls the second characteristic detector based on a detection result of the first characteristic detector.

5. The image forming system according to claim 4, wherein the hardware processor calculates a shrinkage ratio of the recording medium based on detection results of the first characteristic detector and the second characteristic detector.

6. The image forming system according to claim 4, wherein the hardware processor controls an image forming condition of the image former based on a shrinkage ratio of the recording medium.

7. The image forming system according to claim 4, wherein the hardware processor performs control such that the second characteristic detector does not perform detection in accordance with the detection result of the first characteristic detector.

8. The image forming system according to claim 7, wherein the hardware processor controls the second characteristic detector not to perform the detection in response to the detection result of the first characteristic detector being equal to or less than a predetermined threshold value.

9. The image forming system according to claim 8, wherein
- the characteristic information is information corresponding to a moisture amount of the recording medium, and
- the hardware processor controls the second characteristic detector not to perform the detection in response to the information corresponding to the moisture amount detected by the first characteristic detector being equal to or less than a predetermined threshold value.

10. The image forming system according to claim 4, wherein the hardware processor changes a detection method by the second characteristic detector in accordance with the detection result of the first characteristic detector.

11. The image forming system according to claim 10, wherein
- the characteristic information is information corresponding to a moisture amount of the recording medium, and
- the hardware processor changes the detection method by the second characteristic detector in accordance with the information corresponding to the moisture amount detected by the first characteristic detector.

12. The image forming system according to claim 10, wherein the hardware processor changes a frequency of detection by the second characteristic detector as a change in the detection method.

13. The image forming system according to claim 12, wherein the hardware processor changes, as the change in the detection method, a detection position on the recording medium by the second characteristic detector.

14. The image forming system according to claim 10, wherein
- the first characteristic detector and the second characteristic detector are capable of detecting the characteristic information on one recording medium a plurality of times, and
  - the hardware processor changes, as a change in the detection method, a number of times of detection for one recording medium by the second characteristic detector.

15. The image forming system according to claim 14, wherein, in response to a variation in a plurality of results of detection by the first characteristic detector being less than or equal to a predetermined value, the hardware processor makes the number of times of detection by the second characteristic detector less than a predetermined number of times of detection.

16. The image forming system according to claim 14, wherein, in response to all results of detection performed by the first characteristic detector a plurality of times being less than or equal to a predetermined threshold value, the hardware processor makes the number of times of detection by the second characteristic detector less than a predetermined number of times of detection.

17. A control method of an image forming system including: an image former that forms an image on a recording medium; a first characteristic detector that is provided on an upstream side of the image former in a conveyance direction of the recording medium and detects characteristic information corresponding to a characteristic of the recording medium; and a second characteristic detector that is provided on a downstream side of the image former in the conveyance direction of the recording medium and detects the characteristic information, the control method comprising:

controlling, based on a detection result of one characteristic detector that is one of the first characteristic detector and the second characteristic detector, the other characteristic detector of the first characteristic detector and the second characteristic detector.

18. A non-transitory computer-readable storage medium storing a program for a computer of an image forming system including: an image former that forms an image on a recording medium; a first characteristic detector that is provided on an upstream side of the image former in a conveyance direction of the recording medium and detects characteristic information corresponding to a characteristic of the recording medium; and a second characteristic detector that is provided on a downstream side of the image former in the conveyance direction of the recording medium and detects the characteristic information, the program causing the computer to perform controlling, based on a detection result of one characteristic detector that is one of the first characteristic detector and the second characteristic detector, the other characteristic detector of the first characteristic detector and the second characteristic detector.

* * * * *